(12) United States Patent
Hester et al.

(10) Patent No.: US 9,018,800 B2
(45) Date of Patent: Apr. 28, 2015

(54) HIGH EFFICIENCY WIDE LOAD RANGE BUCK/BOOST/BRIDGE PHOTOVOLTAIC MICRO-CONVERTER

(75) Inventors: Richard Knight Hester, McKinney, TX (US); Sairaj Vijaykumar Dhople, Champaign, IL (US); Nagarajan Sridhar, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 831 days.

(21) Appl. No.: 13/194,725

(22) Filed: Jul. 29, 2011

(65) Prior Publication Data

US 2012/0126624 A1   May 24, 2012

Related U.S. Application Data

(60) Provisional application No. 61/415,718, filed on Nov. 19, 2010.

(51) Int. Cl.
| | |
|---|---|
| *H02J 1/00* | (2006.01) |
| *H02J 1/12* | (2006.01) |
| *G05F 1/67* | (2006.01) |
| *H02J 3/38* | (2006.01) |
| *H02M 3/158* | (2006.01) |

(52) U.S. Cl.
CPC ... *H02J 1/12* (2013.01); *G05F 1/67* (2013.01); *H02J 3/385* (2013.01); *H02M 3/1582* (2013.01); *Y02E 10/58* (2013.01)

(58) Field of Classification Search
USPC .......................................................... 307/82
See application file for complete search history.

(56) References Cited

U.S. PATENT DOCUMENTS

| | | | |
|---|---|---|---|
| 2007/0035975 A1* | 2/2007 | Dickerson et al. ............ | 363/131 |
| 2010/0002470 A1 | 1/2010 | Kiamilev et al. | |
| 2012/0025618 A1* | 2/2012 | Erickson et al. ................ | 307/77 |
| 2012/0228947 A1* | 9/2012 | Noy ................................ | 307/80 |
| 2012/0242303 A1* | 9/2012 | Ishii et al. ..................... | 323/234 |
| 2014/0049115 A1* | 2/2014 | Adest et al. ..................... | 307/77 |

OTHER PUBLICATIONS

G. R. Walker, et al., "Cascaded dc-dc converter connection of photovoltaic modules," IEEE Transactions on Power Electronics, vol. 19, pp. 1130-1139, Jul. 2004.

L. Linares, et al., "Improved energy capture in series string photovoltaics via smart distributed power electronics," Proc. IEEE Applied Power Electronics Conference, pp. 904-910, 2009.

(Continued)

*Primary Examiner* — Jared Fureman
*Assistant Examiner* — Duc M Pham
(74) *Attorney, Agent, or Firm* — William B. Kempler; Frank D. Cimino

(57) ABSTRACT

Series strings of photovoltaic (PV) modules with integrated dc-dc microconverters that can function in buck, boost, or an intermediate bridge mode based on the load can harvest more energy than conventional central-inverter architectures, especially when the arrays are partially shaded or when the modules are mismatched. The integrated multi-mode dc-dc converter includes a maximum power point tracking (MPPT) algorithm that can track the true MPP, even when a PV module becomes partially-shaded, without scanning the entire output voltage range. The algorithm compares power levels only at a voltage that occurs when a bypass diode bypasses a portion of an associated PV module, and multiples thereof.

18 Claims, 8 Drawing Sheets

(56) References Cited

OTHER PUBLICATIONS

D. Shmilovitz, "On the control of photovoltaic maximum power point tracker via output parameters," IEEE Proc.—Electric Power Applications, vol. 152, pp. 239-248, Mar. 2005.

Hohm, et al., "Comparative Study of Maximum Power Point Tracking Algorithms Using an Experimental, Programmable, Maximum Power Point Tracking Test Bed," Photovoltaic Specialists Conference, 2000. Conference Record of the Twenty-Eighth IEEE, 2000.

TMS320x2802x, 2803x Piccolo High Resolution Pulse Width Modulator (HRPWM), Users Guide, Texas Instruments Incorporated, 2009.

TMS320F28030/28031/28032/28033/28034/28035 Piccolo Microcontrollers (Rev. D), Data Manual, Texas Instruments Incorporated, Jun. 2010.

HIT Photovoltaic Module, Sanyo Energy (U.S.A.) Corp., Sep. 1, 2009.

* cited by examiner

HIGH EFFICIENCY WIDE LOAD RANGE BUCK/BOOST/BRIDGE PHOTOVOLTAIC MICRO-CONVERTER

CROSS-REFERENCE TO RELATED APPLICATIONS

This application claims priority from U.S. provisional patent application No. 61/415,718, filed Nov. 19, 2010, which is assigned to the assignee hereof and incorporated herein by reference in its entirety.

FIELD

The various circuit, method, and system embodiments described herein relate in general to photovoltaic (PV) systems of the type having arrays of PV modules series connected to a string inverter, and, more specifically, to systems, circuits, and methods for determining a maximum power point (MPP) of a photovoltaic (PV) module in a PV system of the type described, and for starting a perturb and observe (P&O) algorithm thereat.

BACKGROUND

A typical grid-tied photovoltaic (PV) installation 10 is shown in FIG. 1, built with arrays of PV modules 12-14 that are series-connected to a string inverter 16. The output from the string inverter 16 is connected to an ac grid 18 to which ac power is supplied.

An emerging system architecture 20, is shown in FIG. 2. The emerging system architecture 20 supplements the string-inverter paradigm, using a plurality of dc-dc converters 22-24 dedicated to respective individual PV modules 12-14. The dc-dc converters of the type used herein may be operated with microcontrollers 22-24, and are sometimes referred to herein as "dc-dc microconverters." The basic power-converter circuits may have, for example, buck, boost, buck-boost, Ćuk converter current control capabilities.

The dc-dc microconverters 22-24 in the architecture 20 of FIG. 2 provide a number of advantages. In particular, conventional systems are known to underperform if any of the individual PV modules 12-14 in a series string are partially shaded, for example, due to cloud cover or shadowing. The systems may also underperform if they are non-uniformly illuminated, for example, due to different roof angles in residential settings. The systems may also underperform if they are mismatched, for example, due to aging or manufacturing differences of the PV panels. However, the use of dc-dc microconverters enable these problems to be addressed by enabling a maximum power point tracking (MPPT) algorithm to be implemented at the individual PV module level so that underperforming modules do not constrain the whole PV string or array.

More particularly, when light striking a PV module is not uniform, multiple peaks or maxima may exist in power versus output current or power versus output voltage. These local maxima confuse perturb-and-observe (P&O) algorithms that simply increment or decrement a control variable (output current or output voltage) to increase power.

In order to identify the power maxima the entire range of possible voltages must be scanned, requiring large amounts of time. Additionally, once a power maximum is determined from the identified power maxima in order to start a P&O algorithm, generally if shading or other conditions changes, the same parameters continue to be used, thereby requiring very large adjustment times to accommodate the changed conditions.

In addition, in the past, MPPT algorithms do not provide for continuous maximum power point switching between power modes, such as between buck and boost modes, or vice versa. This results in reduced efficiency during mode switching, which requires relatively large components, such as electrolytic capacitors, or the like, for compensation, which, in turn, results in a relatively large form factor of the PV microconverters in the PV system.

What is needed is a method, system, and circuit for determining the MPP, without scanning the entire power range over which the PV array is operated to enable a P&O algorithm to be started in a manner that avoids the P&O algorithm from being confused by a plurality of local power maxima. What also is needed is a method for providing continuous maximum power switching between power modes.

SUMMARY

PV modules possess bypass diodes to prevent damage caused by partial shading conditions. If one uses knowledge of the number of diodes in the module along with a measurement of the module open circuit voltage, then one can reliably predict the vicinity where all possible local maxima can occur. A quick output power measurement at these locations avoids a scan over all possible currents (or voltages) and results in a starting point for the P&O algorithm that is close to the true maximum power. This start-up procedure is repeated periodically when a change in output power exceeds a threshold.

Thus, according to one embodiment of a method to determine a maximum power point (MPP) of a photovoltaic (PV) module a voltage is determined at which a bypass diode of the PV module bypasses an associated portion of the PV module, and multiples of the voltage are determined. A largest of the power points occurring at the voltage and at the multiples of the voltage is selected to be the MPP. A starting point may be established for a perturb and observe (P&O) algorithm that is substantially equal to the MPP.

According to an embodiment of a photovoltaic (PV) power system, a plurality of PV modules are provided. Each of the PV modules has a plurality of bypass diodes, each bypass diode operative to bypass an associated PV module portion when a voltage output of the associated PV module portion falls below a predetermined voltage. A plurality of dc-dc microconverters are also provided. Each microconverter has an input connected to a respective PV module output, and the dc-dc converters have their outputs connected in series. Each of the dc-dc microconverters includes a microcontroller that is programmed to determine a largest of power maxima that occur at voltages corresponding to a voltage, and multiples thereof, that occur when a bypass diode bypasses the associated PV module portion, without scanning all voltage outputs. The microcontroller may also be programmed to run a perturb and observe algorithm from a starting voltage near the largest of the power maxima. In addition, the microcontroller may be programmed to redetermine a largest of the power maxima and rerun the perturb and observe algorithm from a starting voltage near the redetermined largest of the power maxima, if a change in output power of the microcontroller exceeds a predetermined threshold.

According to an embodiment of a microconverter for connection to an output of a PV module having a plurality of bypass diodes to bypass respective associated PV module portions when an output of the associated PV module portion below a predetermined voltage a microcontroller is provided. A microcontroller program means causes the microcontroller to determine a largest of power maxima that occur at voltages corresponding to a voltage, and multiples thereof, that occur when a bypass diode bypasses an associated PV module without scanning all output voltages. A microcontroller program means causes the microcontroller to run a perturb and observe algorithm from a starting voltage substantially equal to the largest of the power maxima. The microcontroller may also include program means to cause the microcontroller to redetermine a largest of the power maxima and rerun the perturb and observe algorithm from a starting voltage near the redetermined largest of the power maxima, if a change in output power exceeds a predetermined threshold.

BRIEF DESCRIPTION OF THE DRAWINGS

In the various figures of the drawing, like reference numbers are used to denote like or similar parts.

DETAILED DESCRIPTION

Figure 1:
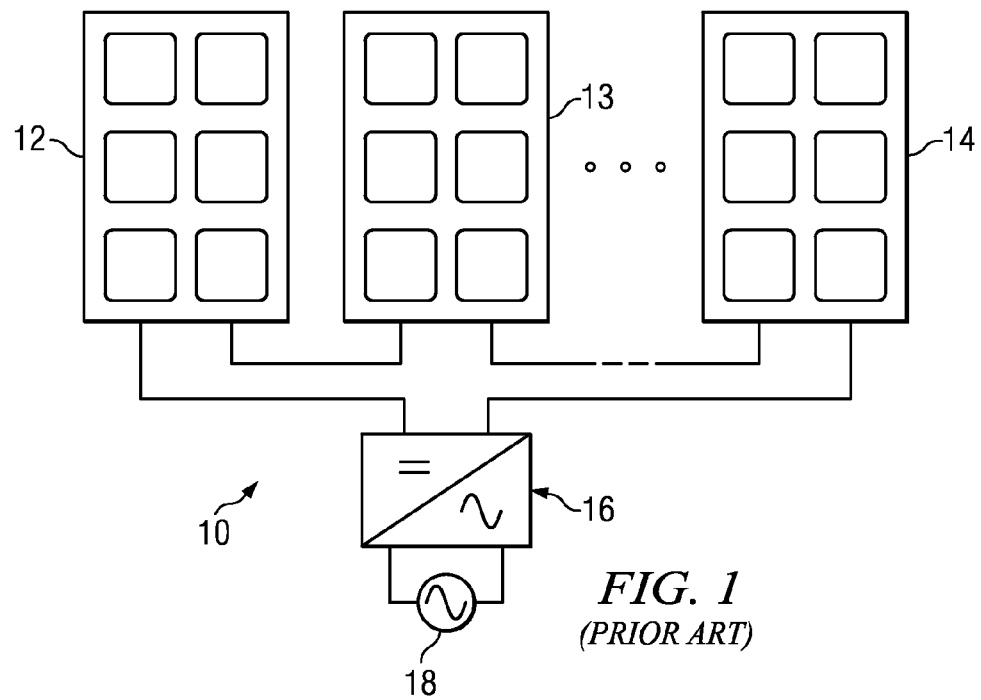
FIG. 1 is an example of a PV array having a conventional central inverter architecture.
Figure 2:
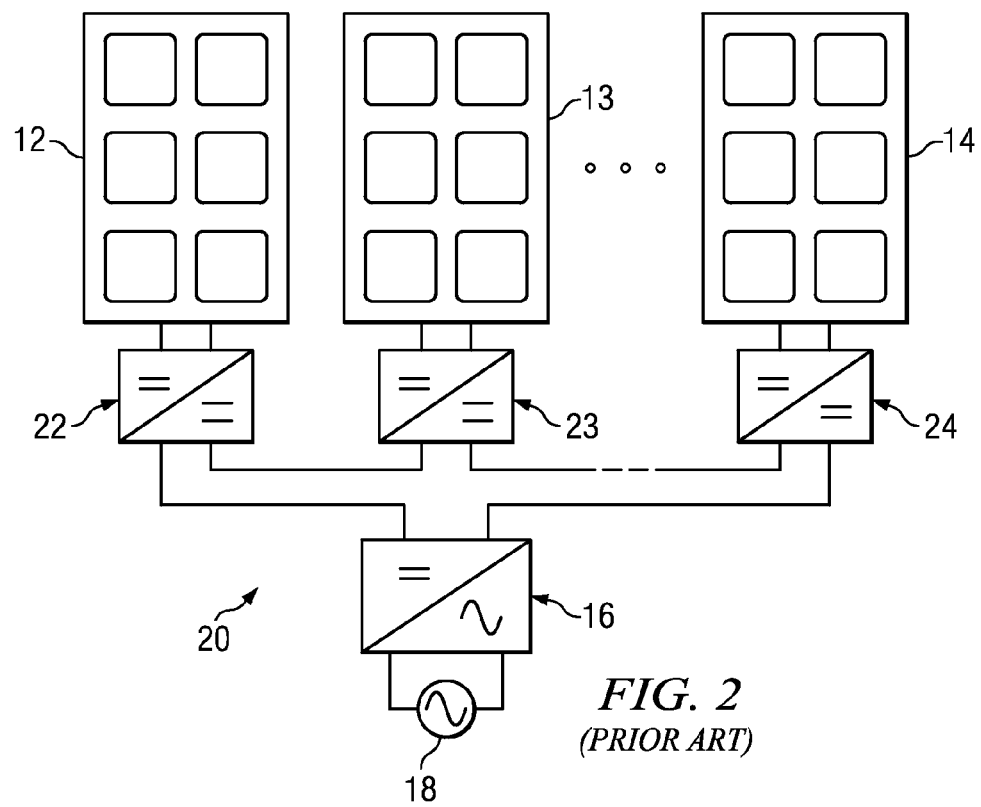
FIG. 2 is an example of a PV array having an emerging microconverter system architecture.

The various embodiments illustrated herein provide topology and control techniques that maximize versatility and efficiency of a continuous maximum power point tracking (MPPT) control system of a photovoltaic (PV) power supply system, or the like. An example circuit extends a buck-boost power stage, such as that which may be employed in the system 20 of FIG. 2, by introducing an intermediate bridge mode that enables continuous maximum power point tracking (MPPT). Based on load current, a digital control technique may be used to manage a seamless transfer across switching modes on a cycle-by-cycle basis. Synchronous rectification achieves efficiency above 95%, while a high switching frequency of 250 kHz enables the use of small passive components, reducing the need for electrolytic capacitors and aiding in achieving a compact form factor.

Figure 3:
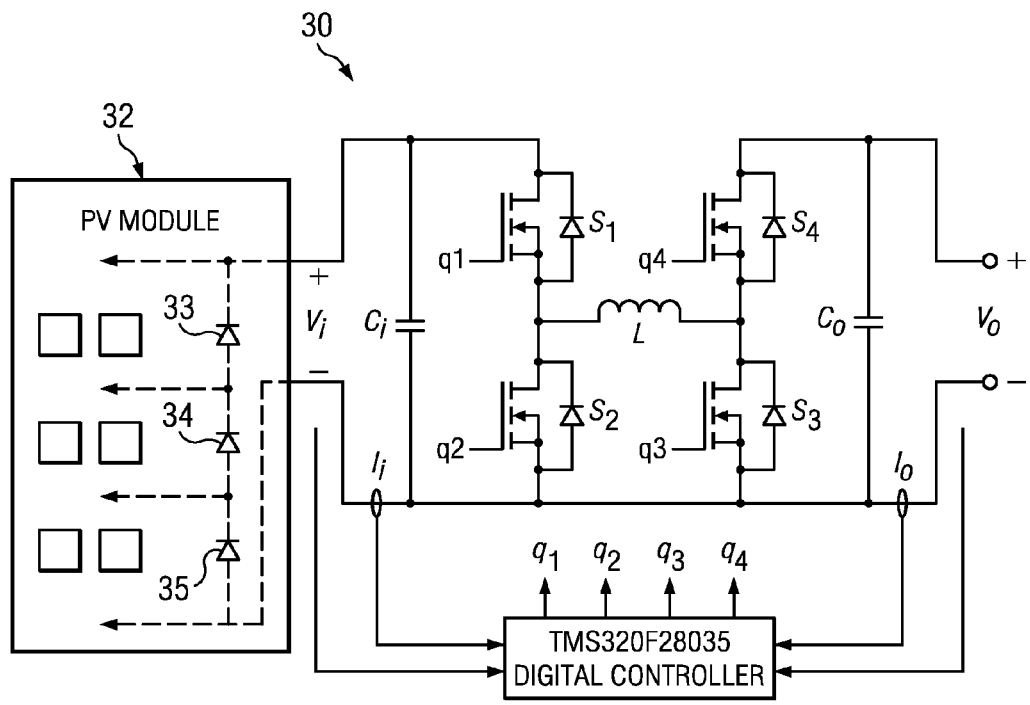
FIG. 3 is an electrical schematic diagram of a microconverter power stage circuit used in conjunction with a PV module.

A power stage 30 used in conjunction with a PV module 32 is illustrated in FIG. 3, to which reference is now made. The power stage 30 and PV module 32 may be one instantiation of a plurality of similarly constructed power stage and PV module units that may be connected in series to provide a dc power output. The dc power output may be for connected, for example, to a dc to ac string inverter 16 (see FIG. 2) to provide ac power to a power grid 18, or other load (see FIG. 2).

The power stage 30 includes buck-side switches, $S_1$ and $S_2$, boost-side switches, $S_3$ and $S_4$, an inductor, L, and input and output capacitors, $C_i$ and $C_o$, respectively. The switches $S_1$-$S_4$ may be, for example, n-channel MOS devices, as shown. In addition, low-side current sensing resistors (not shown) and buffer amplifiers (not shown) may be provided to enable the acquisition of input and output voltage, $V_{in}$ and $V_{out}$, and current, $I_{in}$ and $I_{out}$, as well as 5 V and 12 V on-board housekeeping supplies (not shown) powered by the PV module 32.

Diodes 33-35 are built into the PV module 32, as is standard in the industry. As an example, a 215 W, SANYO HIT 215N module (available from SANYO Energy (USA) Corp., San Jose, Calif.) may be used which includes built in bypass diodes, such as the bypass diodes 33-35 shown. When any portion of the PV module 32 becomes shaded, the voltage output from the shaded portion falls, thereby forward biasing its associated diode 33, 34, or 35. The forward biased diode 33, 34, or 35 conducts, thereby bypassing the shaded portion of the PV module 32 to protect the shaded portion of the PV module 32 from the current demands placed on it by the load. In the example illustrated, the PV module 32 is shown with three diodes 33-35; however, other PV module types may have more or fewer bypass diodes, depending on the make and model of the PV panel under consideration.

The power stage 30 is intended to be compatible with a wide variety of PV sources and a central inverter load. The power stage also is expected to harvest energy from partially-shaded PV sources. To accomplish these goals, the power stage 30 must operate in both buck and boost modes. In one embodiment, the power stage 30 may be designed to operate at a nominal input maximum power point (MPP) of about 40 V and 5 A (IMP, VMP). The inductance, L, may be about 40 μH. At the MPP, continuous current mode (CCM) buck operation is effective when the input current exceeds approximately 300 mA for any buck load current. Similarly, in boost mode, CCM is effective when the input current exceeds 2 A.

In addition, PWM constraints are imposed by minimum switch ON-times of 100 nsec (S2 and S4) and 133 nsec (S1 and S3) and a dead time of 150 nsec at all switch transitions. Consequently, the buck duty cycle, Dbu, (the fraction of S1 ON-time) cannot have a value between 0.9 and 1.0. Likewise, the boost duty cycle, Dbo (the fraction of S3 ON-time) cannot have a value between 0 and 0.033. The PWM method described below provides a smooth transition between the buck and boost modes as load current increases while adhering to all switching constraints.

The ideal dc gain of the converter is given by:

$$G = \frac{V_o}{V_i} = \frac{I_i}{I_o} = \frac{D_{bu}}{1 - D_{bo}}.$$

Buck mode switching, where Dbo=0, may be used for 0<G<0.9, where the minimum S2 ON-time is required. Likewise, boost mode switching, where Dbu=1, may be used for G>1.034. The duty cycle resolution is 0.00375% (150 psec steps).

Figure 4:
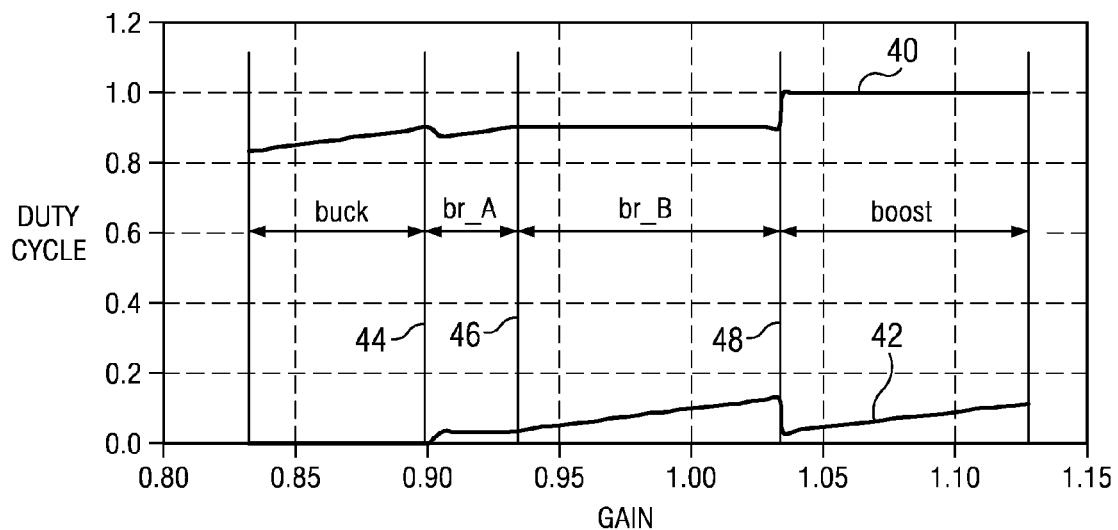
FIG. 4 is a graph of duty-cycle versus gain, illustrating an example of buck duty cycle, Dbu, and boost duty cycle, Dbo, in a buck-to-boost transition region.

To obtain similar resolution in the buck-to-boost transition range, 0.9<G<1.034, bridge switching is employed. To accomplish the bridge switching, the bridge mode is divided into two regions, br_A and br_B, as shown in FIG. 4, to which reference is now additionally made. In FIG. 4, Dbu 40 and Dbo 42 are plotted as a function of converter gain. At the low-gain end 44 of br_A, S3 is switched on for its minimum allowable time, 133 nsec, corresponding to Dbo=0.033. At the same time, Dbu=0.875, which results in a gain of 0.9052. To increase the gain within the br_A region, Dbu is increased up to a maximum of 0.9 (again limited by S2 minimum ON-time), corresponding to a converter gain of 0.9310, until the high end 46 of the br_A region.

In the br_B region, Dbo is varied while holding Dbu=0.9. The high-gain end 48 of br_B, 1.033, is reached when a smooth transition to boost mode can be made employing the minimum S3 ON-time. It is worth noting that, given the minimum and dead time switching constraints, this strategy achieves the minimum possible average inductor current at all values of gain and therefore minimizes the conductive losses in the inductor and the switches.

In bridge operation, the relative phase of S1 and S3 switching is chosen to minimize ripple current. The ON-time of switch S1 (S3) is symmetrical about the beginning (middle) of the 4 μsec switching period.

Figure 5:
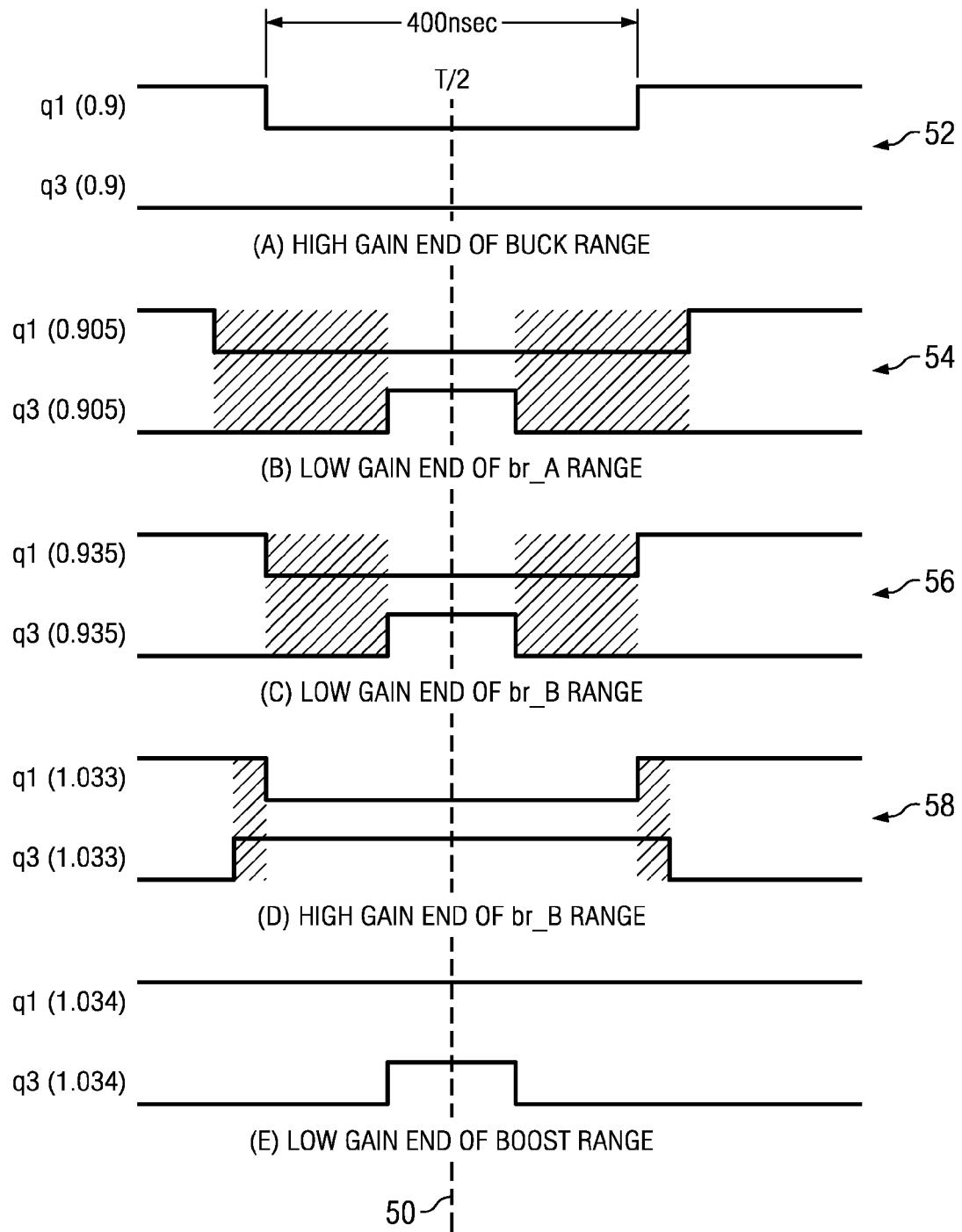
FIG. 5 illustrates waveforms showing details of PWM switching in a buck-to-boost transition region.

FIG. 5, to which reference is now additionally made, illustrates the detail of the resulting switch waveforms of each switching mode over an 800 nsec time interval in the center 50 of the switching period. Waveforms 52 show the voltages for q1 and q3 at the high gain end of the buck range, and waveforms 54 show the voltages for q1 and q3 at the low gain end of the buck range. Waveforms 56 show the voltages for q1 and q3 at the low gain end of the br_A range, and waveforms 58 show the voltages for q1 and q3 at the high gain end of the br_B range.

Note that in the br_A and br_B modes, outside the brief shaded time intervals, the voltage across the inductor is approximately (or in some cases exactly) zero. Thus, the ripple current is very small, further reducing the conductive power loss in those switching modes.

Figure 6:
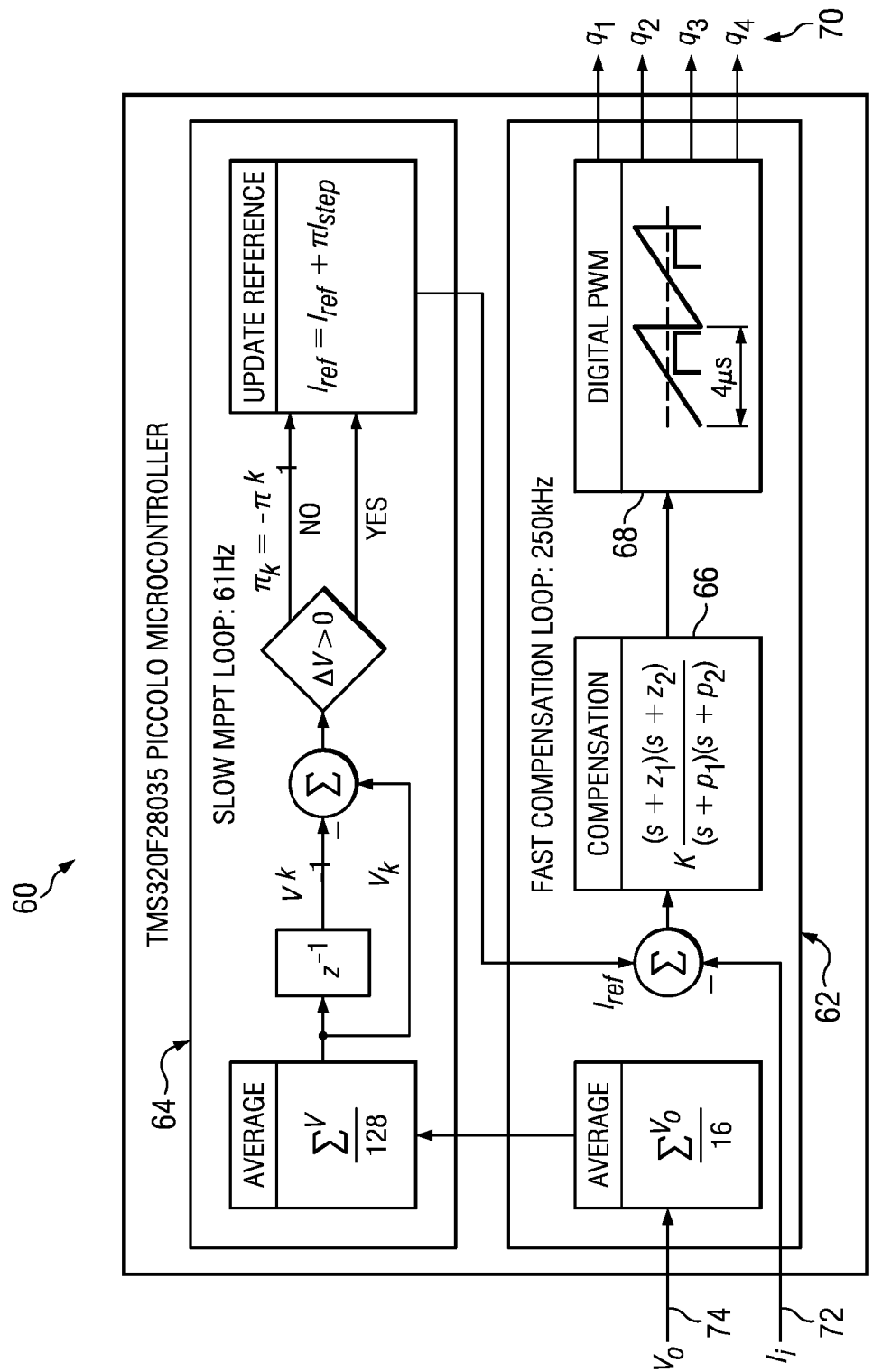
FIG. 6 is a block diagram of a two-loop microcontroller control scheme.

The digital two-loop control method is shown in FIG. 6, to which reference is now additionally made. The digital two-loop control method is implemented on a TMS320F28035 Piccolo™ microcontroller 60 (available from Texas Instruments Incorporated, Dallas, Tex.; "Piccolo™" is a trademark of Texas Instruments Incorporated). A fast inner compensation loop 62 controls input current, driving it to an input current reference level set by a slow MPPT outer loop 64. The slow MPPT outer loop 64 implements the MPPT algorithm.

The fast inner compensation loop 62, sampling at 250 kHz, is compensated in all switching modes with a single fixed function 66, comprising an integrator, a real pole and a complex zero pair. The resulting fast control loop crossover frequency is approximately 1 kHz. PWM driver firmware 68 derives both Dbu and Dbo from a single scalar output 70 of the digital fast inner compensation loop.

Control is implemented by the TMS320F28035 microcontroller. Six channels of its 16-channel data acquisition subsystem are used. Input current 72 and output voltage 74 are acquired on each 4 μsec PWM cycle. Input voltage, output current, and the +5 V and +12 V supplies (not shown) are sampled less frequently for under-voltage conditions. Three of the seven PWM generators of the TMS320F28035 Piccolo™ microcontroller 60 are employed. One is dedicated to buck side switching, a second to boost side switching, and the third controls the phase of the analog input sampling with respect to the switch operation.

Input current sampling and duty cycle update occur at the beginning of the switching cycle, in the center of the S1 ON period, when switching transients produced by the S1-S2 commutation have subsided. This provides virtually the entire 4 μsec for control housekeeping calculations prior to updating the PWM duty at the beginning of the next carrier cycle. The resulting average control loop delay is 6 μsec.

MPPT may be implemented with a hill-climbing algorithm that is tuned to the characteristics of its associated PV module; according to one embodiment a 215 W, SANYO HIT 215N module of the type described above may be used. The SANYO HIT 215N module includes three series-connected sub-strings of 24 cells each. A bypass diode 33, 34, or 35 parallels a respective sub-string to prevent potentially damaging hot spots when partial shading conditions prevent one or more sub-strings from supporting the load current of the module with which it is associated.

Figure 7:
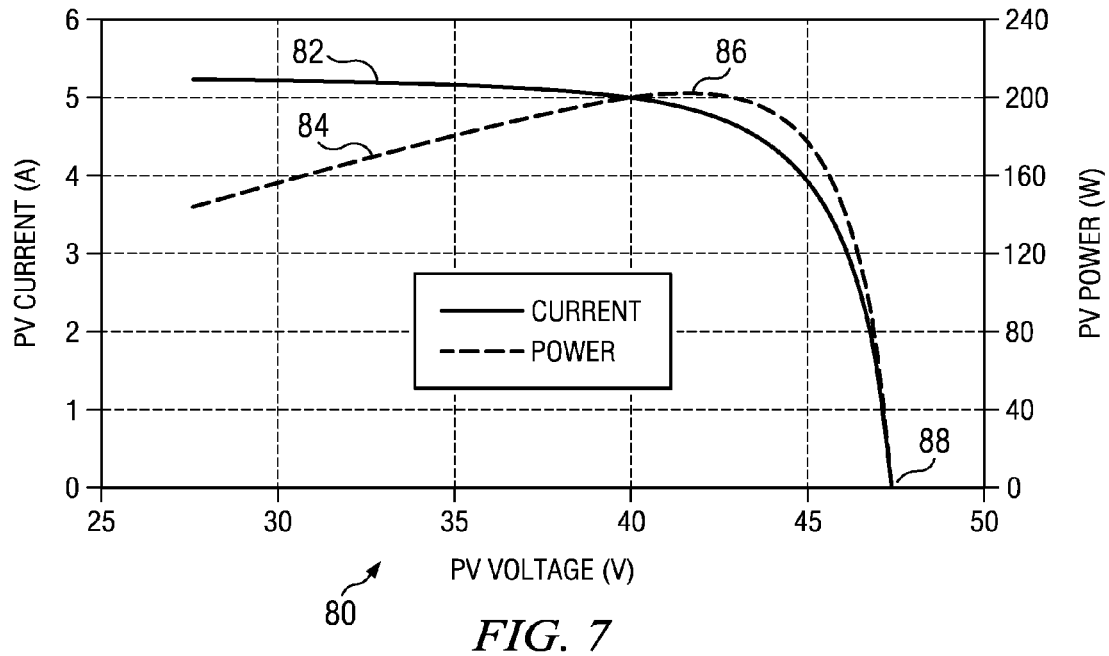
FIG. 7 is a graph of output power and current versus output voltage of a uniformly lighted PV module.

FIG. 7, to which reference is now additionally made, shows a plot 80 of the measured output current 82 and power 84 versus output voltage of a SANYO HIT 215N module, uniformly illuminated by natural sunlight. The measurements indicate that the maximum module power was about 202 W at about 4.87 A and about 41.47 V. Our data revealed that between about 40.44 V and about 42.73 V, (or equivalently about 4.69 A and 4.96 A), the module output power remained within 99% of its peak. Notice also that the output voltage at MPP 86 is roughly 80% of the open circuit voltage, VOC, 88.

Figure 8:
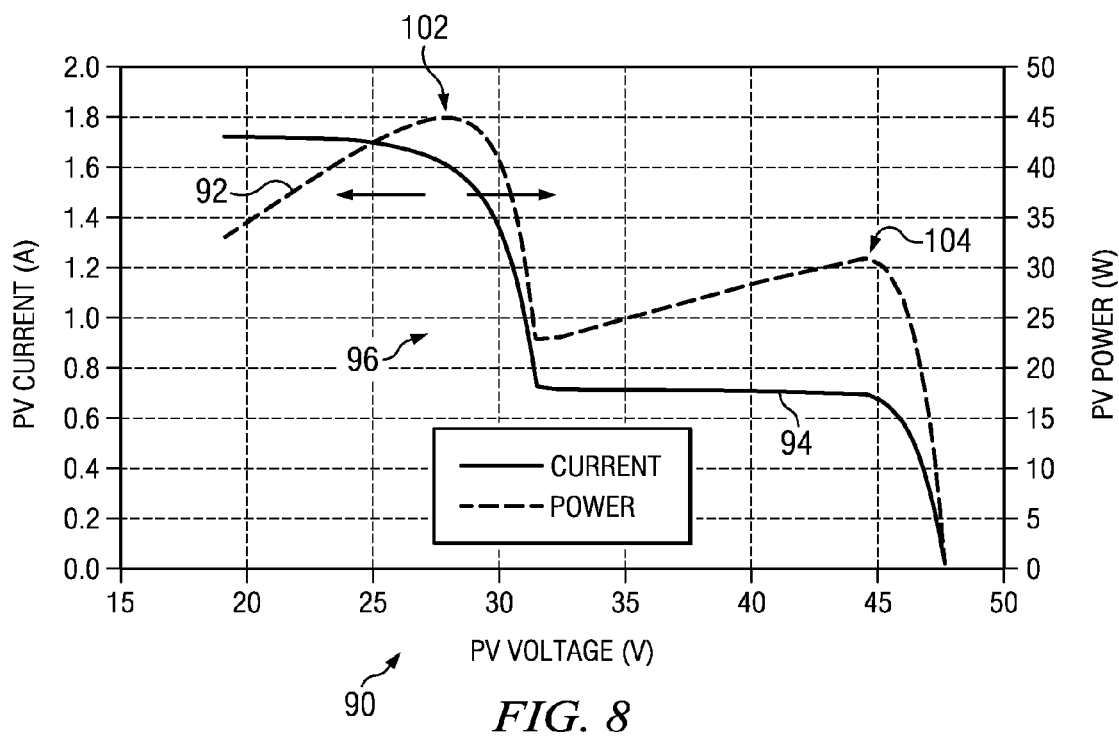
FIG. 8 is a graph of output power and current versus output voltage when one group of 24 cells is shaded more than the cells in other groups.

FIG. 8, to which reference is now additionally made, is a plot 90 of PV power 92 and current 94 versus voltage when non-uniform shading causes one bypass diode, such as the diode 33 in the PV module 32 in FIG. 3, to conduct a portion of the load current. This is manifested in this example by the rapid drop in output voltage in region 96 when the load current exceeds about 750 mA. At higher load current, the bypass diode across the shaded sub-string conducts. As a result, the voltage across it collapses from about 15V to about –1 V, the bypass diode forward bias voltage.

Thus, when a PV module, such as the PV module 32 of FIG. 3, is shaded, one of its internal diode 33 becomes the path of least resistance. Hence, the drop for the substring containing that PV module is no longer the cell voltage times the number of cells (which in this case is 24 cells times 0.65 to 0.7V≈17 V). Instead it is just 0.65 (the diode voltage). However, the system current (the current asked by the inverter), for instance, 5 A, is maintained, since the panels are connected in series. The problem is that there is a dramatic loss of power because of the voltage drop from ~17V (24× 0.7) to ~0.7 V.

In the example shown in FIG. 8, the weakly illuminated sub-string supports only a maximum of 700-750 mA, and the load current corresponding to maximum power harvesting from it is in that range. Maximum power harvesting from the other two groups of PV cells requires about 1.6 A. Thus, there are two peaks 102 and 104 in the power curve 92, and the MPPT algorithm must determine which is the true maximum. It should be noted that lighting conditions may cause two diodes to conduct, producing a third peak (not shown) in the power curve at roughly, 0.25 VOC. In general, a module with N diodes may exhibit N peaks under specific lighting conditions.

MPPT is intended to harvest the maximum available power from the PV module 32 (see FIG. 3). It is most frequently implemented by continuously running algorithms that maximize the product of the microconverter input voltage and current. The analysis we employ uses results obtained by maximizing the output voltage. This has been previously suggested in the art, and after examining the input current and voltage of available string inverters, it appears that they present a very slowly-varying current load to the microconverter. As long as the MPPT algorithm is fast with respect to the inverter input current changes, maximizing output voltage is equivalent to maximizing output power. Also, since maximum output power is the goal, and using the output power directly in the algorithm, rather than using input power, any microconverter efficiency variations are accounted for. Finally, accurate current measurement is difficult. It adds noise, and power computation is a burden to algorithms that maximize power.

The MPPT algorithm implemented in the illustration described herein, begins with the assumption that there may be as many as three peaks in the power curves of the SANYO HIT 215N module located in the vicinity of 0.75 VOC, 0.5 VOC, and 0.25 VOC. A simple hill climbing algorithm will find and track the true maximum peak if it starts near it. This is done by initiating operation in four stages. In the first stage, all switching is halted, and after sufficient settling time, the open circuit voltage is sampled. In the second stage, the output current of the PV module is increased until its output voltage drops to 0.75 VOC, at which time the microconverter output voltage and the PV module output current are recorded. This is repeated for 0.50 VOC and 0.25 VOC in the third and fourth stages, respectively. In a final stage, the operation shifts to the use of a continuous MPPT using the perturb- and observe algorithm, starting at the PV output current corresponding to the highest microconverter output voltage observed in stages two through four. The final stage of operation persists until a change in output voltage greater than a prescribed amount (programmable) is detected, at which time the initiation sequence is repeated.

A prototype of the proposed microconverter has been built and tested. The power stage including all switches, drivers, passives, 12V and 5V housekeeping supplies were powered by the PV source, and an edge connector for the control board that contains the TMS320F28035 microcontroller and a 3.3 V LDO. All four switches are TCPA8054 n-channel MOSFETs. Each pair, S1-S2 and S3-S4, is driven by a UCC27201 that provides both high- and low-side drivers. The high-side driver employs a bootstrapped internal supply that must be periodically refreshed every 2 msec in this implementation. This microconverter may be constructed internally to PV modules, and this prototype firmware is tuned for a SANYO HIT 215N module. Relevant parameters of the prototype and the SANYO HIT 215N module are listed in Table I.

TABLE I

Micro-converter and PV Module Parameters

| Symbol | Quantity | Value |
| --- | --- | --- |
| L | Inductance | 40 µH |
| $C_i$ | Input capacitance | 15.4 µF |
| $C_o$ | Output capacitance | 15.4 µF |
| $f_{SW}$ | Switching frequency | 250 kHz |
| $V_M$ | MPP voltage (STC) | 42.0 V |
| $I_M$ | MPP current (STC) | 5.13 A |
| $P_M$ | Maximum power | 215 W |
| $V_{OC}$ | Open-circuit voltage | 51.6 V |
| $I_{SC}$ | Short-circuit current | 5.61 A |

Figure 9:
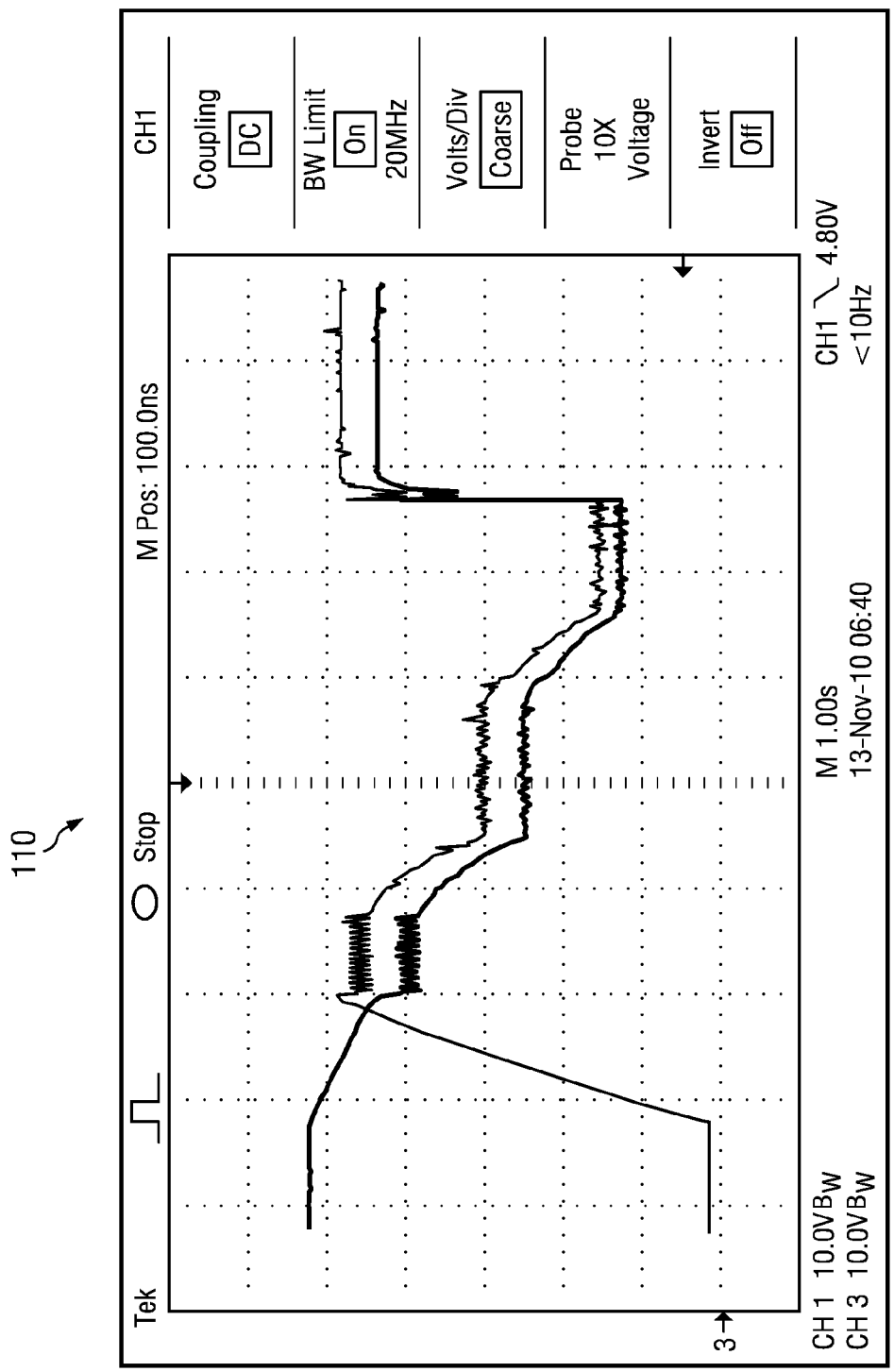
FIG. 9 is a reproduction of an oscilloscope trace showing voltage versus time of PV module and microconverter outputs during each phase of an MPPT algorithm.

A scope trace 110, shown in FIG. 9 to which reference is now additionally made, illustrates the microconverter initialization sequence described above. In this particular example, in order to display clearly each of the stages of the process, the sequence completes in about 7 seconds, but it can easily be executed an order of magnitude faster.

Figure 10:
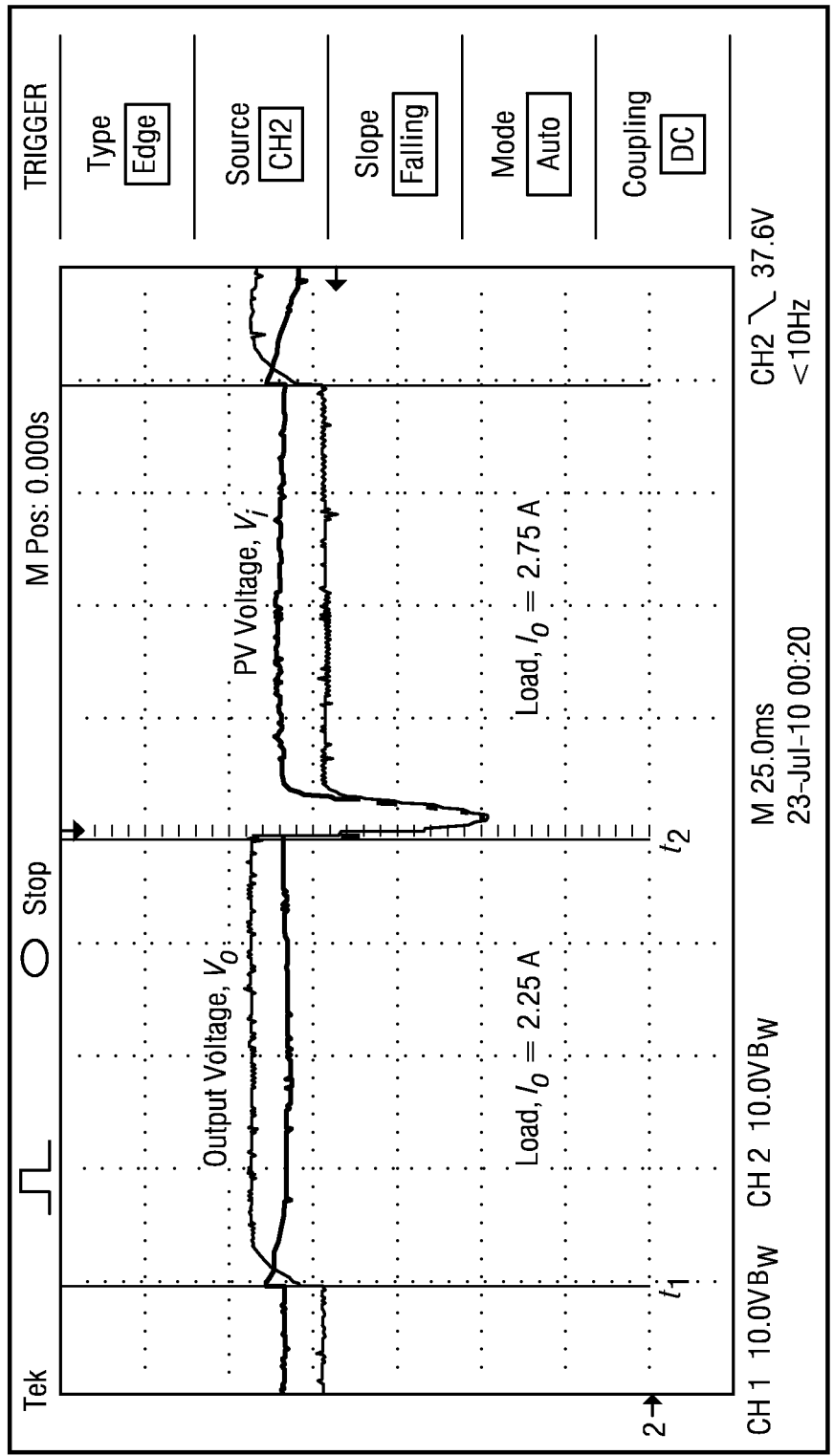
FIG. 10 is a reproduction of an oscilloscope trace showing voltage versus time showing a transient response of a microconverter to ±0.5 A load steps.
Figure 11:
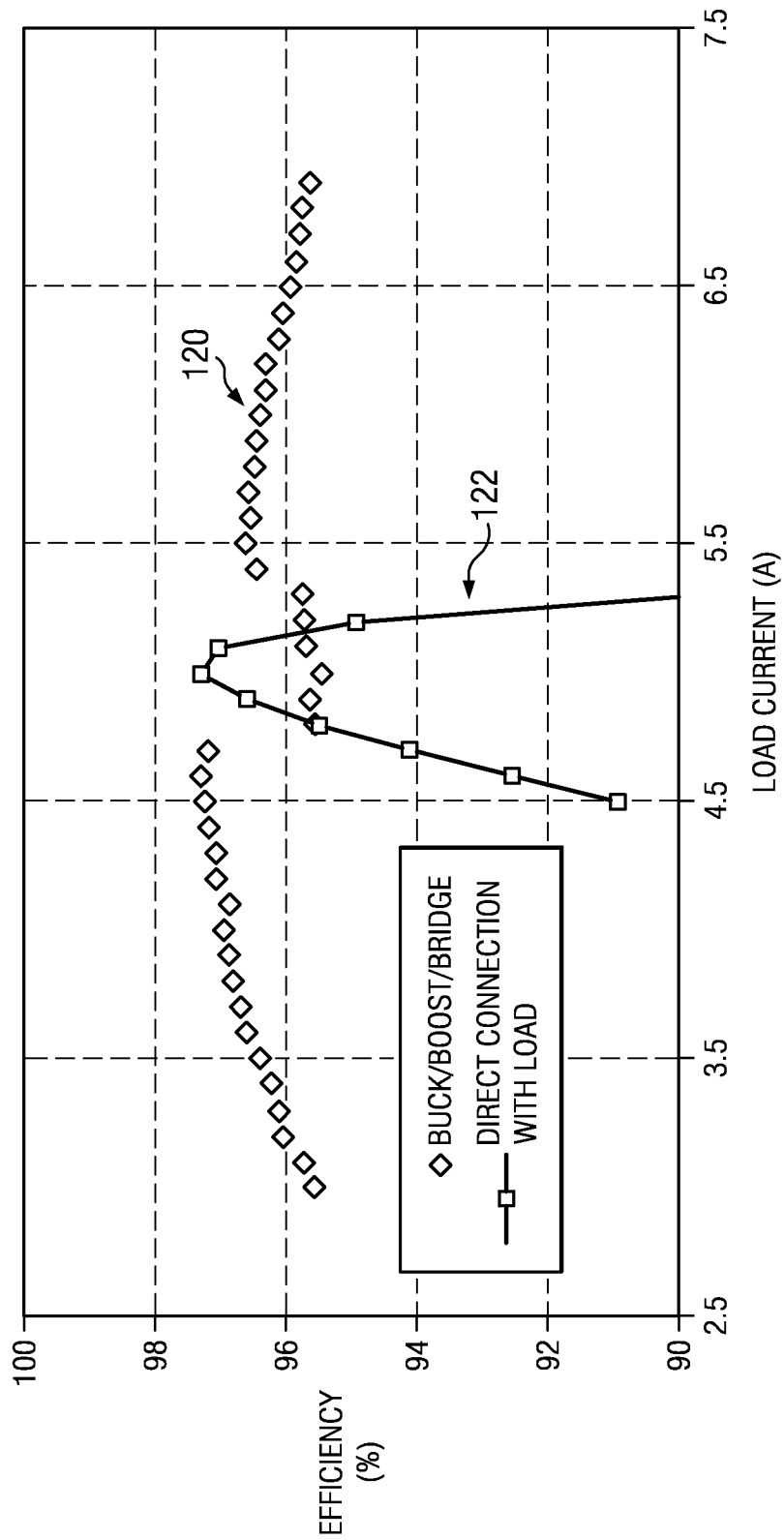
FIG. 11 is a graph of measured total efficiency of a switching microconverter (diamonds) and a direct connection (squares) versus load current.

The scope trace 115 of FIG. 10 illustrates the transient behavior of PV voltage, $V_i$, and output voltage, $V_o$, due to steps in load current, $I_o$, while continuously tracking the maximum power point. The MPP PV current is 2.5 A. At time $t_1$, the load is stepped from 2.75 A to 2.25 A. This causes a change in mode of operation from buck to boost mode. At time $t_2$, the load is stepped back up to 2.75 A, and the converter returns to buck mode. In each case, the settling time is approximately 10 msec. The settling waveforms differ because the PV source is biased at its maximum power point and the sudden step current increase at $t_2$ causes a large drop in the PV voltage due to its steep decline with increasing PV current above its maximum power current.

The efficiency percentage of the buck boost bridge and for a direct connection with a load for the converter operated at MPPT for a range of load currents is plotted by curves 120 and 122 in FIG. 12. The efficiency here represents the percentage of potentially harvestable electrical power, which may be diminished either by circuit losses or by MPP error.

Buck (boost) mode efficiency 122 approaches, or exceeds 97%, while the bridge mode 120 is about 1% lower, due to increased switching losses. Here, the MPP is within a few tens of milliamps of the ideal. Total efficiency is limited by circuit losses, for example, ~1% in control overhead, ~1% in conductive, and ~1% in switching. The solid curve 122 represents total efficiency when the load is directly connected to the module (S1-S4 ON). When directly connected, a mismatch of load current with MPP current by as little as 150 mA diminishes the total efficiency below that of the microconverter operating in bridge mode.

It should be noted that the example described above is particularly designed for the SANYO HIT 215N module. However, because the device, system, and methods described herein can be tailored to the particular PV module with which it is associated, the overall performance can be made significantly faster than previous devices, systems and methods.

Electrical connections, couplings, and connections have been described with respect to various devices or elements. The connections and couplings may be direct or indirect. A connection between a first and second electrical device may be a direct electrical connection or may be an indirect electrical connection. An indirect electrical connection may include interposed elements that may process the signals from the first electrical device to the second electrical device.

Although the invention has been described and illustrated with a certain degree of particularity, it should be understood that the present disclosure has been made by way of example only, and that numerous changes in the combination and arrangement of parts may be resorted to without departing from the spirit and scope of the invention, as hereinafter claimed.

The invention claimed is:

1. A method to determine a maximum power point (MPP) of a photovoltaic (PV) module, comprising:
   determining a voltage at which each bypass diode of said PV module bypasses an associated portion of said PV module at multiples of $0.75*V_{OC}*(1/N)$;
   determining multiples of said voltage;
   selecting a largest of the power points occurring at said voltage and at said multiples of said voltage to be said MPP; and
   establishing a starting point for a perturb and observe (P&O) algorithm that is substantially equal to said MPP,
      where $V_{OC}$ is the open circuit voltage of the PV module and N is the number of such modules.

2. The method of claim 1 further comprising reestablishing a starting point for said P&O algorithm if a change in output power of said PV module exceeds a predetermined threshold.

3. The method of claim 2 wherein said change in output power of said PV module is caused by a shading of at least a portion of said PV module.

4. The method of claim 1 wherein said determining a voltage at which a bypass diode of said PV module bypasses an associated portion of said PV module is based upon an open circuit voltage.

5. The method of claim 1 wherein said determining a voltage at which a bypass diode of said PV module bypasses an associated portion of said PV module is based on an output voltage of a microcontroller.

6. The method of claim 1 wherein said determining a voltage at which a bypass diode of said PV module bypasses an associated portion of said PV module is based on an output current of a microcontroller.

7. The method of claim 1 further comprising providing three PV modules.

8. The method of claim 1 further comprising providing a dc-dc converter controlled by said microcontroller to function in buck, boost, or intermediate bridge mode, based on a load demand.

9. A photovoltaic (PV) power system, comprising:
a plurality of PV modules, each of said PV modules having a plurality of bypass diodes, each bypass diode operative to bypass an associated PV module portion when a voltage output of said associated PV module portion falls below a predetermined voltage; and
a plurality of dc-dc microconverters, each microconverter having an input connected to a respective PV module output, said plurality of dc-dc converters having outputs connected in series;
each of said dc-dc microconverters comprising a microcontroller programmed to determine a largest of power maxima that occur at voltages corresponding to a voltage, and multiples thereof, that occur when a bypass diode bypasses said associated PV module portion at multiples of $0.75*V_{OC}*(1/N)$, without scanning all voltage outputs, wherein said microcontroller is also being programmed to run a perturb and observe algorithm from a starting voltage near said largest of said power maxima.

10. The PV power system of claim 9 wherein said microcontroller is programmed to redetermine a largest of said power maxima and rerun said perturb and observe algorithm from a starting voltage near said redetermined largest of said power maxima, if a change in output power of said microcontroller exceeds a predetermined threshold.

11. The PV power system of claim 10 wherein said change in output power of said PV module is caused by a shading of at least one portion of said PV module.

12. The PV power system of claim 9 further comprising a dc-ac inverter having an input across which said series connected outputs of a plurality of dc-dc converters are connected.

13. The PV power system of claim 9 wherein said voltages corresponding to a voltage, and multiples thereof, that occur when a bypass diode bypasses an associated PV module are open circuit voltages.

14. The PV power system of claim 9 wherein said power maxima are based on output voltages of said microconverter.

15. The PV power system of claim 9 wherein said power maxima are based on output currents of said microconverter.

16. The PV power system claim 9 wherein said plurality of PV modules are an N number of PV modules.

17. A microconverter for connection to an output of a PV module having a plurality of bypass diodes to bypass respective associated PV module portions when an output of said associated PV module portion below a predetermined voltage, comprising:
a microcontroller;
a microcontroller program means to cause said microcontroller to determine a largest of power maxima that occur at voltages corresponding to a voltage, and multiples thereof, that occur when a bypass diode bypasses an associated PV module at multiples of $0.75*V_{OC}*(1/N)$, without scanning all output voltages, and;
a microcontroller program means to cause said microcontroller to run a perturb and observe algorithm from a starting voltage substantially equal to said largest of said power maxima.

18. The microconverter of claim 17 further comprising program means to cause said microcontroller to redetermine a largest of said power maxima and rerun said perturb and observe algorithm from a starting voltage near said redetermined largest of said power maxima, if a change in output power exceeds a predetermined threshold.

* * * * *